(12) United States Patent
Berg et al.

(10) Patent No.: US 12,348,532 B2
(45) Date of Patent: Jul. 1, 2025

(54) METHOD AND APPARATUS FOR RESISTING DOWNGRADE ATTACK FOR PRIVATE LIMITED CONNECTION

(71) Applicant: Intel Corporation, Santa Clara, CA (US)

(72) Inventors: Johannes Berg, Detmold (DE); Ido Ouzieli, Tel Aviv (IL); Po-Kai Huang, San Jose, CA (US); Ilan Peer, Modiin (IL); Emily Qi, Gig Harbor, WA (US)

(73) Assignee: Intel Corporation, Santa Clara, CA (US)

( * ) Notice: Subject to any disclaimer, the term of this patent is extended or adjusted under 35 U.S.C. 154(b) by 859 days.

(21) Appl. No.: 17/358,043

(22) Filed: Jun. 25, 2021

(65) Prior Publication Data

US 2021/0320935 A1    Oct. 14, 2021

(51) Int. Cl.
*H04L 29/06* (2006.01)
*H04L 9/40* (2022.01)

(52) U.S. Cl.
CPC ...... *H04L 63/1416* (2013.01); *H04L 63/0435* (2013.01); *H04L 63/102* (2013.01); *H04L 63/1425* (2013.01); *H04L 63/20* (2013.01)

(58) Field of Classification Search
CPC ............. H04L 63/1416; H04L 63/0435; H04L 63/102; H04L 63/1425; H04L 63/20

USPC .......................................................... 370/328
See application file for complete search history.

(56) References Cited

U.S. PATENT DOCUMENTS

| | | | |
|---|---|---|---|
| 2011/0154039 A1* | 6/2011 | Liu | H04L 63/0869 713/168 |
| 2013/0095789 A1* | 4/2013 | Keevill | H04W 12/068 455/411 |
| 2014/0050320 A1* | 2/2014 | Choyi | H04W 12/06 380/270 |
| 2021/0050999 A1* | 2/2021 | Huang | H04L 9/088 |
| 2021/0282007 A1* | 9/2021 | Ho | H04W 12/041 |

* cited by examiner

*Primary Examiner* — Christopher M Crutchfield
*Assistant Examiner* — Jean F Voltaire
(74) *Attorney, Agent, or Firm* — East IP P.C.

(57) ABSTRACT

The disclosure provides a method for resisting downgrade attack for private limited connection, comprising: performing a 4-way handshake between an initiating entity and a responding entity to establish a PMKSA; receiving, by the initiating entity, a frame from the responding entity during the 4-way handshake, wherein the frame comprises an indication of usage of private limited connection for all responding entities in a network identified by a SSID of the responding entity; and establishing, by the initiating entity, a private limited connection in the network identified by the SSID of the responding entity.

18 Claims, 9 Drawing Sheets

200 performing a 4-way handshake between an initiating entity and a responding entity to establish a PMKSA — 210 receiving, by the initiating entity, a frame from the responding entity during the 4-way handshake, wherein the frame comprises an indication of usage of private limited connection for all responding entities in a network identified by a SSID of the responding entity — 220 establishing, by the initiating entity, a private limited connection in the network identified by the SSID of the responding entity — 230

FIG.2

METHOD AND APPARATUS FOR RESISTING DOWNGRADE ATTACK FOR PRIVATE LIMITED CONNECTION

TECHNICAL FIELD

Embodiments of the present disclosure generally relate to wireless communications in a wireless local area network (WLAN), and in particular, to a method and an apparatus for resisting downgrade attack for private limited connection.

BACKGROUND

In IEEE 802.11aq, MAC privacy enhancement are defined. Specifically, MAC Address Randomization is provided to avoid some forms of tracking, as described below:

MAC privacy enhancements are enabled on a non-AP STA when dot11MACPrivacyActivated is set to true. The STA shall periodically change its MAC address to a random value while not associated to a BSS. The STA shall construct the randomized MAC address from the locally administered address space as defined in IEEE Std 802-2014 and IEEE Std 802c™_2017.

If such a non-AP STA starts any transaction that establishes state bound to a MAC address and might elect to establish an association or establish transaction state with a discovered BSS, it shall check the value of dot11LocallyAdministeredMACConfig and shall configure its MAC address according to the rules of the local address space prior to the start of the transaction. State created with an AP using a prior MAC address, for instance, RSN preauthentication state or FT state established over-the-DS, is bound to the MAC address used when that state was created. Prior to establishing an association to the AP, the non-AP STA shall change its MAC address to the MAC address used when the state was created.

The non-AP STA connecting to an infrastructure BSS shall retain a single MAC address for the duration of its connection across an ESS. A PMKSA created as part of an RSNA will contain the MAC address used to create the PMKSA. The non-AP STA that supports PMKSA caching shall, if necessary, change its MAC address back to that value when attempting a subsequent association to the ESS using PMKSA caching.

To construct a random MAC address, the STA shall select a randomized MAC address according to IEEE Std 802-2014 and IEEE Std 802c-2017.

When dot11MACAddressPolicyActiviated is true, an AP shall set the MAC Address Policy field in the Extended Capabilities field to 1, indicating the existence of a MAC address policy. When dot11MACAddressPolicyActivated is false, an AP STA shall set the MAC Address Policy field in the Extended Capabilities field to 0, indicating that local MAC addresses are not restricted.

A non-AP STA that receives from an AP an Extended Capabilities field with the Local MAC Address Policy subfield set to 1 should, unless it has previously stored the MAC address policy for the ESS, discover that policy, using the MAC Address Policy ANQP-element, before sending any Association Request frame to that AP using a local MAC address as the TA.

A Pairwise master key identifier (PMKID) is an identifier that is used to identify a Pairwise Master Key Security Association (PMKSA), which is the context resulting from a successful IEEE 802.1X exchange, Simultaneous Authentication of Equals (SAE) authentication, Fast Initial Link Setup (FILS) authentication (IEEE 802.11ai), or preshared PMK information.

If a PMKID, which is carried in a (re)association request frame, is recognized by a peer, then the required authentication exchange between both sides to have PMKSA with master key like PMK or Master PMK (MPMK), for Fast basic service set (BSS) transition (FT) initial mobility domain association, can be skipped to save time needed for the initial connection. This mechanism is called PMKSA caching.

BRIEF DESCRIPTION OF THE DRAWINGS

The various advantages of the embodiments will become apparent to one skilled in the art by reading the following specification and appended claims, and by referencing the following drawings, in which:

FIG. 2 is a flowchart showing a method 200 for resisting downgrade attack for private limited connection according to some embodiments of the disclosure;

DETAILED DESCRIPTION

Various aspects of the illustrative embodiments will be described using terms commonly employed by those skilled in the art to convey the substance of the disclosure to others skilled in the art. However, it will be apparent to those skilled in the art that many alternate embodiments may be practiced using portions of the described aspects. For purposes of explanation, specific numbers, materials, and configurations are set forth in order to provide a thorough understanding of the illustrative embodiments. However, it will be apparent to those skilled in the art that alternate embodiments may be practiced without the specific details. In other instances, well-known features may have been omitted or simplified in order to avoid obscuring the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrases "in an embodiment", "in one embodiment" and "in some embodiments" are used repeatedly herein. The phrase generally does not refer to the same embodiment; however, it may. The terms "comprising," "having," and "including" are synonymous, unless the context dictates otherwise. The phrases "A or B" and "A/B" mean "(A), (B), or (A and B)."

A PMKID carried in a (re)association request frame also presents privacy issue since PMKID does not change and may be used as an identifier to track the device. A private limited connection is proposed to enhance the privacy. Specifically, in the communication between an initiating entity and a responding entity, the initiating entity starts a private limited connection to the responding entity to establish a PMKSA. The connection is private and limited because only basic and standardized capability and operation element will be included in the frame exchange. As a result, an attacker cannot use an element fingerprint mechanism to track the initiating entity even if the initiating entity has used a mechanism like randomized MAC address to avoid tracking.

The initiating entity can be a non-AP STA and the responding entity can be an AP. Alternatively, the initiating entity can be a non-AP Multi-link device (MLD) which has one or more non-AP STAs and the responding entity can be an AP MLD which has one or more APs.

Figure 1:
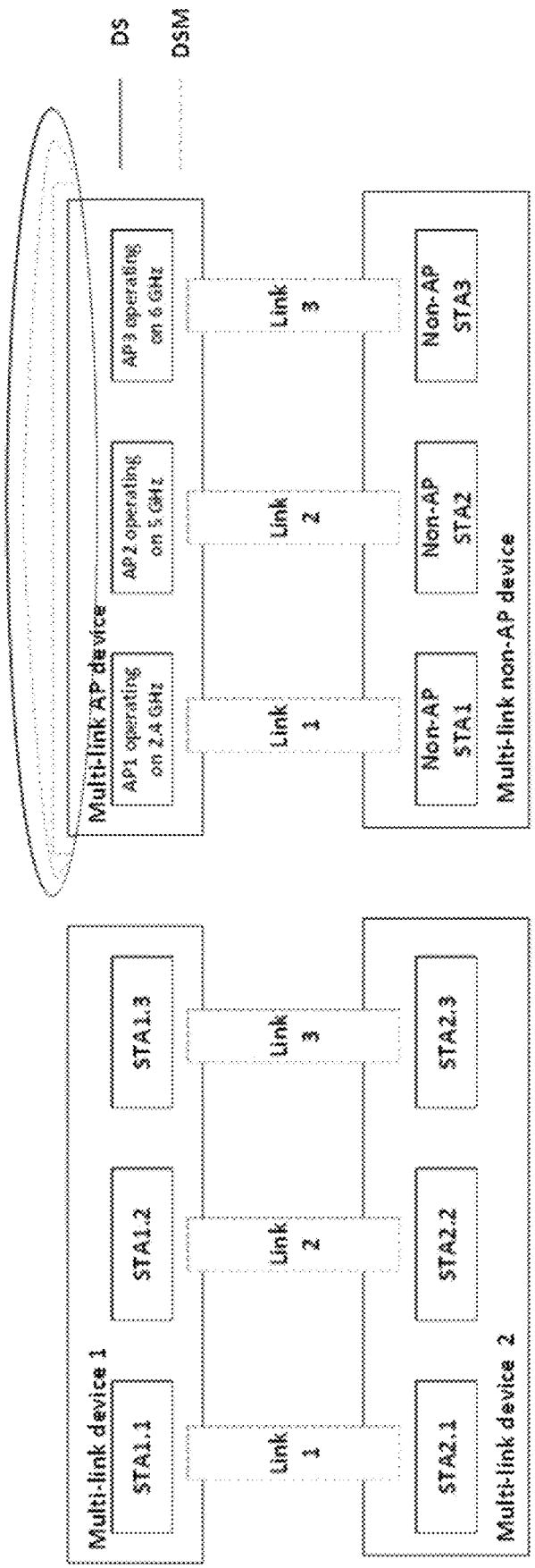
FIG. 1 is a diagram showing a multi-link framework.

A MLD is a logical entity that has one MAC data service interface and primitives to the LLC and a single address associated with the interface, which can be used to communicate on DSM. As shown in FIG. 1, which shown a multi-link framework. The multi-link framework includes multi-link devices, for example, a multilink AP device and a multi-link non-AP device.

Each MLD has a MLD MAC address. Each STA of a MLD also has a STA MAC address. Different STAs of a MLD have different STA MAC addresses. The MAC address of the MLD may be the same or different from one of the MAC addresses of the STAs of the MILD. The MAC address of MLD is introduced to make sure that the traditional mapping of AP and STA from a high layer point of view is preserved under multi-link, and the mapping is replaced with AP MLD and non-AP MLD independent of the STA MAC addresses used by the STAs of the MLD.

Back to private limited connection, in order to use the mechanism of the private limited connection, the responding entity will have a capability bit to indicate support of private limited connection.

It is possible that there is an evil twin responding entity like an evil twin AP or an evil twin AP MLD, where the Service Set Identifier (SSID) and other operation parameters like MAC address of the evil twin responding entity are exactly the same as the actual responding entity. However, the evil twin responding entity will indicate no support of private limited connection. As a result, an initiating entity may discover the evil twin responding entity with no support of private limited connection and still connects and includes all the capability and operational elements even though the actual responding entity supports private limited connection. The attacker then succeeds in downgrading the initiating entity's operation.

In order to enhance private and security, the mechanism of private limited connection may need to be improved. In the present disclosure, it is proposed to have an indication from the responding entity to always force the usage of private limited connection for the corresponding network identified by the SSID of the responding entity.

As a result, once the initiating entity connects to any actual responding entity in a network identified by the SSID, the initiating entity will see the indication, and if the bit indicating usage of private limited connection all the time, then the initiating entity will just use private limited connection all the time to connect to any responding entity in the network identified by the same SSID.

The mechanism prevents downgrade attack for connection to a responding entity in a network identified by one SSID once the initiating entity connects to any responding entity in the network identified by the same SSID.

As a result, the tracking possibility is limited to only the first connection to any responding entity in a network identified by one SSID.

FIG. 2 is a flowchart showing a method 200 for resisting downgrade attack for private limited connection according to some embodiments of the disclosure. As shown in FIG. 2, the method 200 may include: S210, performing a 4-way handshake between an initiating entity and a responding entity to establish a PMKSA; S220, receiving, by the initiating entity, a frame from the responding entity during the 4-way handshake, wherein the frame comprises an indication of usage of private limited connection for all responding entities in a network identified by a SSID of the responding entity; and S230, establishing, by the initiating entity, a private limited connection in the network identified by the SSID of the responding entity.

In some embodiments, the method may further comprise: performing frame exchanges between the initiating entity and any of responding entities in the network identified by the SSID of the responding entity using the private limited connection.

In some embodiments, the frame having the indication may be a message 3 of the 4-way handshake. In an embodiment, the indication of usage of private limited connection may be included in a key data encapsulation (KDE) provided in the message 3 of the 4-way handshake. In some embodiment, the 4-way handshake may be a FT 4-way handshake.

In one embodiment, the KDE including the indication may be a transition disable KDE, as defined in WPA3. Table 1 shown a Transition Disable KDE format, wherein one bit in the field of Transition Disable Bitmap is used for the indication of usage of private limited connection.

TABLE 1

Transition Disable KDE format

| Field | Size (Octets) | Value (Hex) | Description |
|---|---|---|---|
| Element ID | 1 | 0xDD | IEEE 802.11 KDE type |
| Length | 1 | Variable | Length of the following fields in the IE in octets. |
| OUI | 3 | 0x50-6F-9A | Wi-Fi Alliance specific OUI (refer to sub-clause 9.4.1.32 of 802.11) |

TABLE 1-continued

Transition Disable KDE format

| Field | Size (Octets) | Value (Hex) | Description |
|---|---|---|---|
| OUI Type | 1 | 0x20 | Identifying the type and version of the Transition Disable KDE |
| Transition Disable Bitmap | Variable | Variable | Bit field indicating transition modes (see [0032]2). |

The Transition Disable Bitmap field index values are shown in Table 2. Note that while connecting to the network identified by the same SSID, the most secure algorithm is the algorithm to use if the bit in the bitmap is set and the transition algorithm describes the algorithm to be disabled if the bit in the bitmap is set.

TABLE 2

Transition Disable Bitmap field index values

| Bit | Name | Most secure algorithms | Transition algorithms |
|---|---|---|---|
| 0 | WPA3-Personal | AKM suite selector 00-0F-AC:8 (SAE) | AKM suite selectors 00-0F-AC:2 and 00-0F-AC:6 (PSK), and any other PSK AKMs<br>AKM suite selector 00-0F-AC:4 (FT over PSK), and any other FT over PSK AKMs |
| 1 | SAE-PK | AKM suite selector 00-0F-AC:8 (SAE) using SAE-PK | AKM suite selector 00-0F-AC:8 (SAE) when not using SAE-PK, and 00-0F-AC:9 (FT over SAE) when not using SAE-PK<br>AKM suite selectors 00-0F-AC:2 and 00-0F-AC:6 (PSK), and any other PSK AKMs<br>AKM suite selector 00-0F-AC:4 (FT over PSK), and any other FT over PSK AKMs |
| 2 | WPA3-Enterprise | AKM suite selector 00-0F-AC:5 (IEEE 802.1X with SHA-256) | AKM suite selector 00-0F-AC:1 (IEEE 802.1X with SHA-1) |
| 3 | Wi-Fi Enhanced Open | AKM suite selector 00-0F-AC:18 (OWE) | Open system authentication without encryption |
| 4 | Private limited connection | Private limited connection to avoid element fingerprint | Connection without using private limited connection to avoid element fingerprint |

In another embodiment, the KDE including the indication of usage of private limited connection may be a downgrade prevention KDE, as defined in IEEE. The downgrade prevention KDE may include a Downgrade Prevention Bitmap field, which may comprise a bit to indicate the use of private limited connection, as shown in Table 3.

TABLE 3

Downgrade Prevention Bitmap field index values

| Bit | Name |
|---|---|
| 0 | Use Private limited connection |

In some embodiments, the frame including the indication may comprise a capability bit to indicate whether the responding entity supports the private limited connection.

Figure 3:
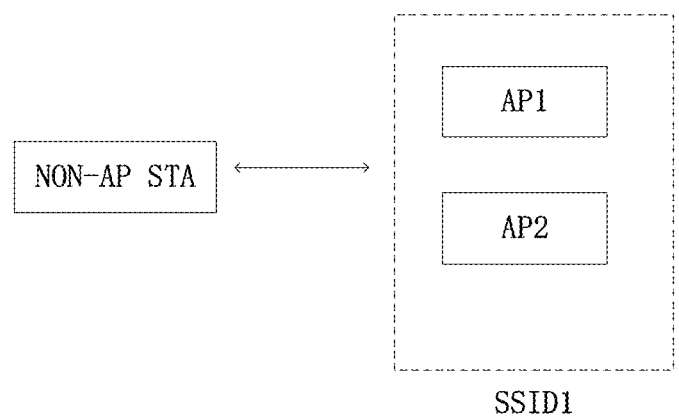
FIG. 3 is a diagram showing an example of usage of private limited connection according to some embodiments of the disclosure.

FIG. 3 shown an example of usage of private limited connection. As shown in FIG. 3, there is an initiating entity, which is a non-AP STA, and two responding entities: AP1 which is an actual AP, and AP2 which is an evil twin AP, wherein AP1 and AP2 have a same SSID, e.g., SSID1. In other words, AP1 and PA2 are in a network identified by SSID1. In addition, we assumed that the non-AP STA does not have any knowledge about SSID1.

In a situation, the non-AP STA discover the capability of an actual AP, i.e., AP1, to support private limited connection, then the non-AP STA will proceed with the private limited connection with the actual AP.

In another situation, the non-AP STA discovers the capability of an evil twin AP, i.e., AP2, without support of private limited connection, then the non-AP STA proceeds with regular connection but not private limited connection with the actual AP, i.e., AP1. During a 4-way handshake, the non-AP STA receives a massage 3 from the AP1, wherein the message 3 indicates that usage of private limited connection for all APs with the same SSID, then the non-AP STA has the knowledge of SSID1 to use private limited connection. As a result, the non-AP STA always uses private limited connection to connect with any APs with SSID1.

Figure 4:
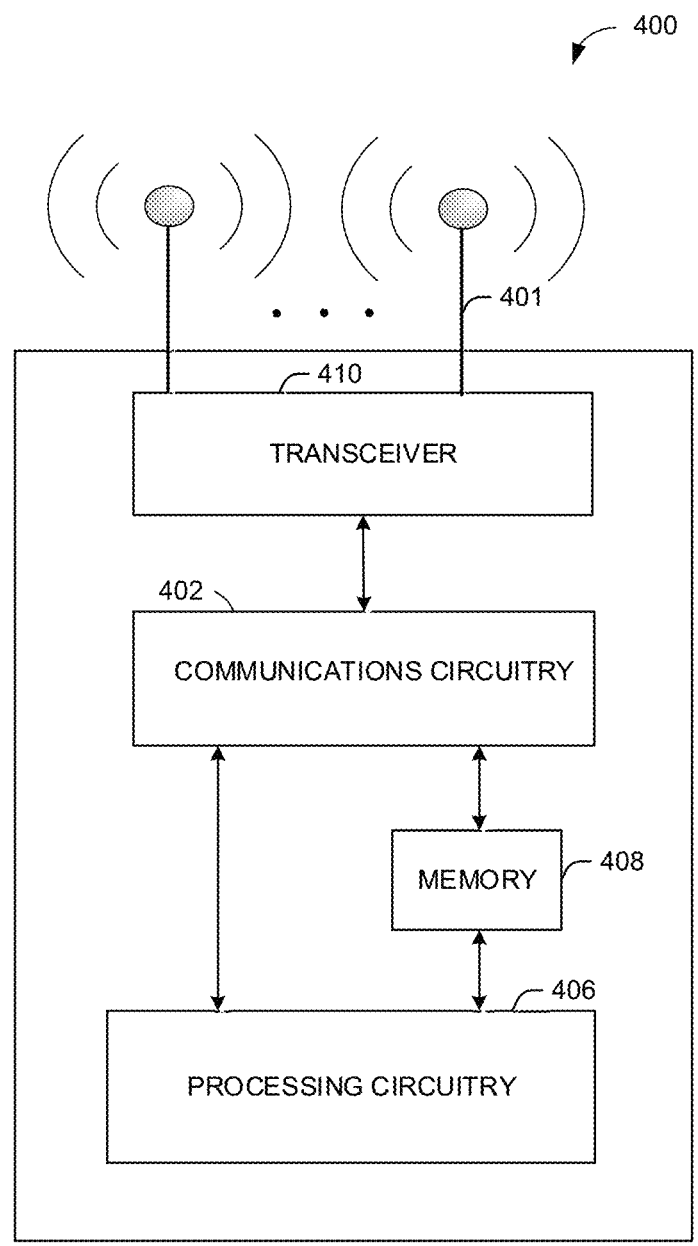
FIG. 4 shows a functional diagram of an exemplary communication device according to some embodiments of the present disclosure.
Figure 5:
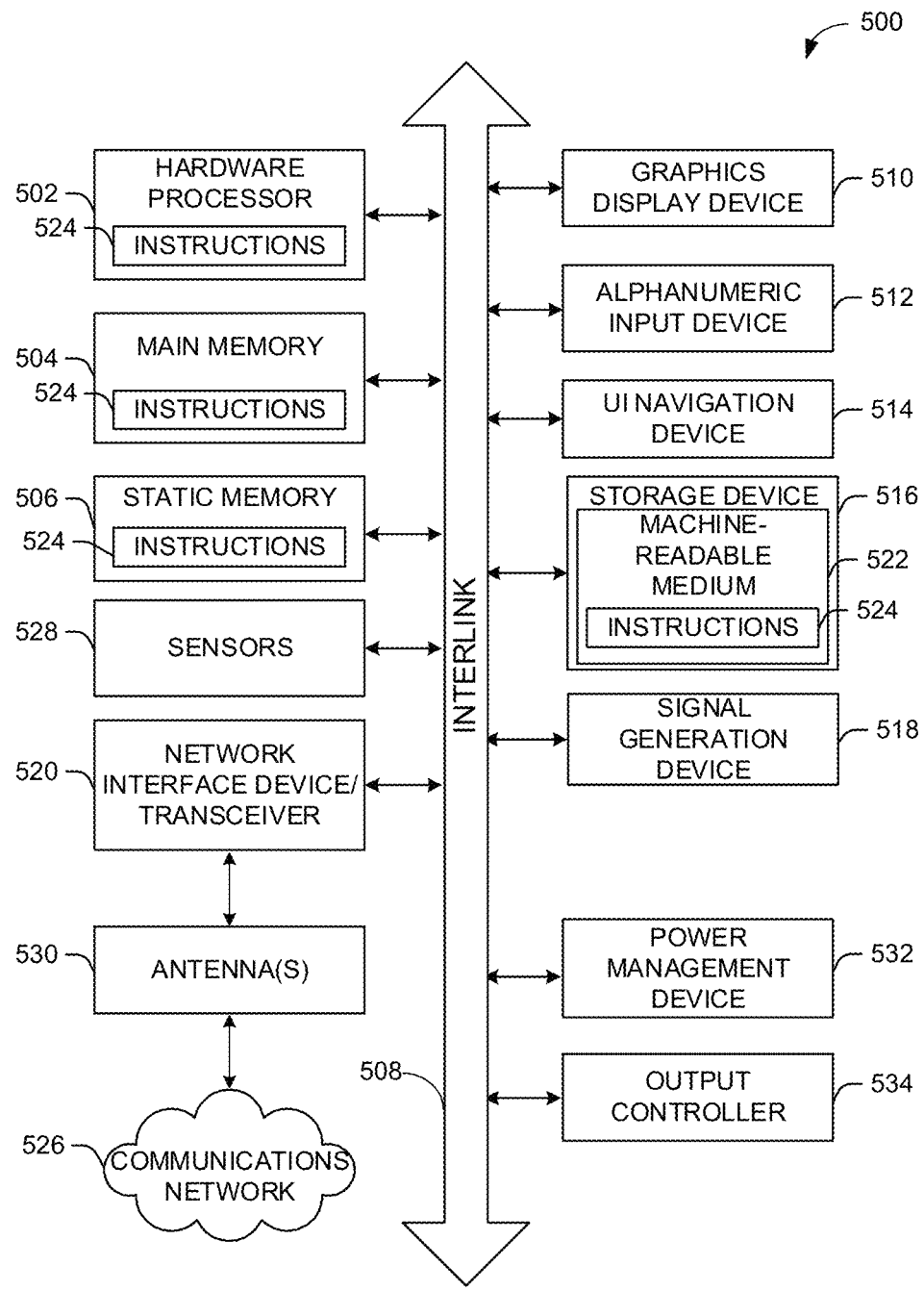
FIG. 5 shows a block diagram of an example of a machine or system upon which any one or more of the techniques discussed herein may be performed, according to some embodiments of the present disclosure.
Figure 6:
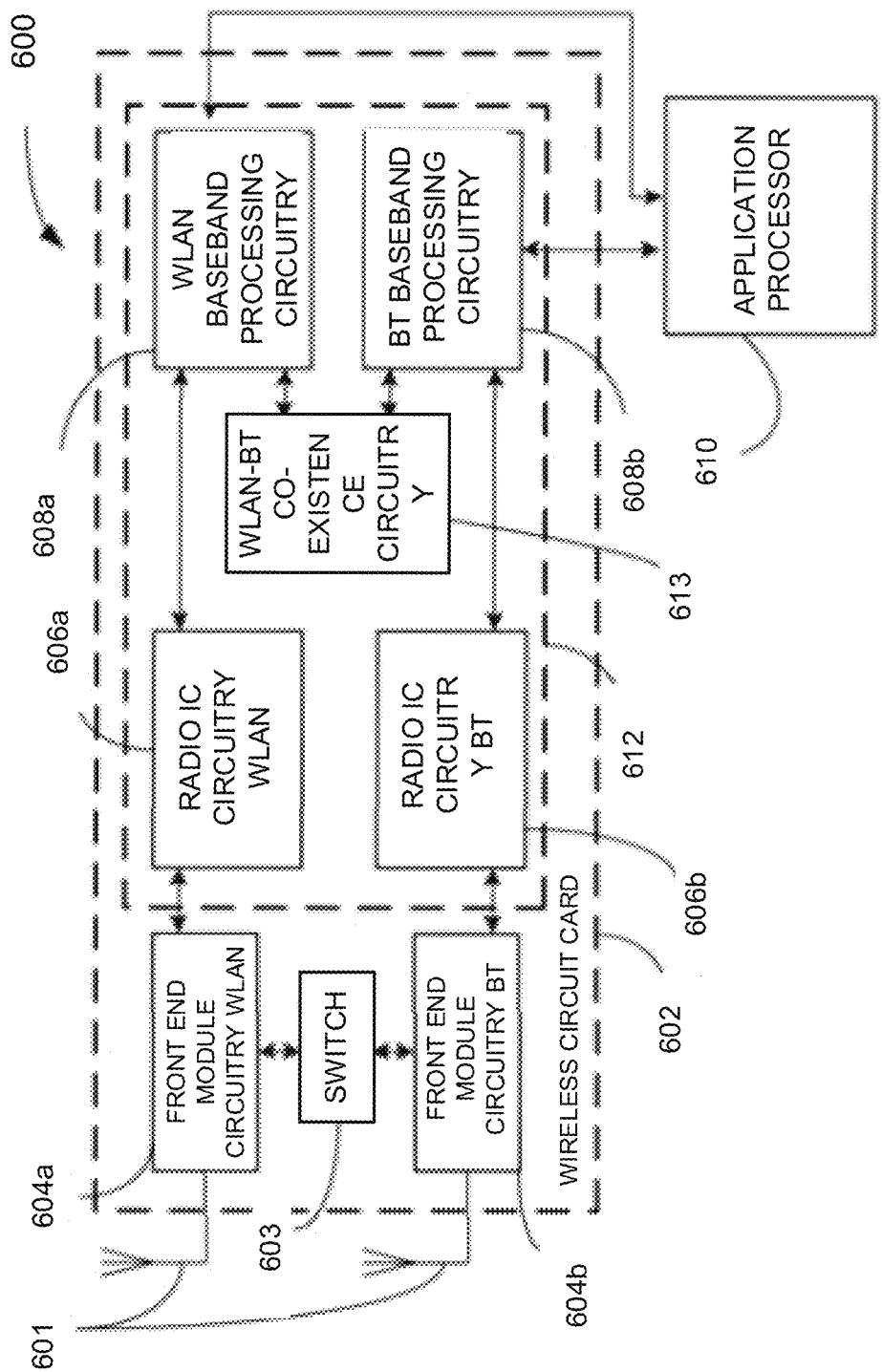
FIG. 6 is a block diagram of a radio architecture according to some embodiments of the present disclosure.

In some embodiments, the initiating entity and the responding entity described above may include one or more function modules similar to those in the functional diagram of FIG. 4 and/or the example machine/system of FIG. 5 or FIG. 6.

It should be appreciated that the method 200 may be implemented in WLANs complying with IEEE 802.11 standards. More particularly, the process 200 of FIG. 2 may be implemented in one or more modules as a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof.

For example, computer program code to carry out operations shown in the process 200 of FIG. 2 may be written in any combination of one or more programming languages, including an object oriented programming language such as JAVA, SMALLTALK, C++ or the like and conventional procedural programming languages, such as the "C" programming language or similar programming languages. Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

FIG. 4 shows a functional diagram of an exemplary communication device 400, in accordance with one or more example embodiments of the disclosure. In one embodiment, FIG. 4 illustrates a functional block diagram of a communication device that may be suitable for use as the AP(s) or the STA(s) in accordance with some embodiments. The communication device 400 may also be suitable for use as a handheld device, a mobile device, a cellular telephone, a smartphone, a tablet, a netbook, a wireless terminal, a laptop computer, a wearable computer device, a femtocell, a high data rate (HDR) subscriber station, an access point, an access terminal, or other personal communication system (PCS) device.

The communication device 400 may include communications circuitry 402 and a transceiver 410 for transmitting and receiving signals to and from other communication stations using one or more antennas 401. The communications circuitry 402 may include circuitry that can operate the physical layer (PHY) communications and/or medium access control (MAC) communications for controlling access to the wireless medium, and/or any other communications layers for transmitting and receiving signals. The communication device 400 may also include processing circuitry 406 and memory 408 arranged to perform the operations described herein. In some embodiments, the communications circuitry 402 and the processing circuitry 406 may be configured to perform operations detailed in the above figures, diagrams, and flows.

In accordance with some embodiments, the communications circuitry 402 may be arranged to contend for a wireless medium and configure frames or packets for communicating over the wireless medium. The communications circuitry 402 may be arranged to transmit and receive signals. The communications circuitry 402 may also include circuitry for modulation/demodulation, upconversion/downconversion, filtering, amplification, etc. In some embodiments, the processing circuitry 406 of the communication device 400 may include one or more processors. In other embodiments, two or more antennas 401 may be coupled to the communications circuitry 402 arranged for transmitting and receiving signals. The memory 408 may store information for configuring the processing circuitry 406 to perform operations for configuring and transmitting message frames and performing the various operations described herein. The memory 408 may include any type of memory, including non-transitory memory, for storing information in a form readable by a machine (e.g., a computer). For example, the memory 408 may include a computer-readable storage device, read-only memory (ROM), random-access memory (RAM), magnetic disk storage media, optical storage media, flash-memory devices and other storage devices and media.

In some embodiments, the communication device 400 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication device 400 may include one or more antennas 401. The antennas 401 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMNO) embodiments, the antennas may be effectively separated for spatial diversity and the different channel characteristics that may result between each of the antennas and the antennas of a transmitting station.

In some embodiments, the communication device 400 may include one or more of a keyboard, a display, a non-volatile memory port, multiple antennas, a graphics processor, an application processor, speakers, and other mobile device elements. The display may be a liquid crystal display (LCD) screen including a touch screen.

Although the communication device 400 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication device 400 may refer to one or more processes operating on one or more processing elements.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication device 400 may include one or more processors and may be configured with instructions stored on a computer-readable storage device.

FIG. 5 illustrates a block diagram of an example of a machine 500 upon which any one or more of the techniques (e.g., methodologies) discussed herein may be performed. In other embodiments, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in peer-to-peer (P2P) (or other distributed) network environments. The machine 500 may be a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 500 may include a hardware processor 502 (e.g., a central processing unit (CPU), a graphics processing unit (GPU), a hardware processor core, or any combination thereof), a main memory 504 and a static memory 506, some or all of which may communicate with each other via an interlink (e.g., bus) 508. The machine 400 may further include a power management device 532, a graphics display device 510, an alphanumeric input device 512 (e.g., a keyboard), and a user interface (UI) navigation device 514 (e.g., a mouse). In an example, the graphics display device 510, alphanumeric input device 512, and UI navigation device 514 may be a touch screen display. The machine 500 may additionally include a storage device (i.e., drive unit) 516, a signal generation device 518 (e.g., a speaker), a network interface device/transceiver 520 coupled to antenna(s) 530, and one or more sensors 528, such as a global positioning system (GPS) sensor, a compass, an accelerometer, or other sensor. The machine 500 may include an output controller 534, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)). The operations in accordance with one or more example embodiments of the disclosure may be carried out by a baseband processor. The baseband processor may be configured to generate corresponding baseband signals. The baseband processor may further include physical layer (PHY) and medium access control layer (MAC) circuitry, and may further interface with the hardware processor 502 for generation and processing of the baseband signals and for controlling operations of the main memory 504, and/or the storage device 516. The baseband processor may be provided on a single radio card, a single chip, or an integrated circuit (IC).

The storage device 516 may include a machine readable medium 522 on which is stored one or more sets of data structures or instructions 524 (e.g., software) embodying or utilized by any one or more of the techniques or functions described herein. The instructions 524 may also reside, completely or at least partially, within the main memory 504, within the static memory 506, or within the hardware processor 502 during execution thereof by the machine 500. In an example, one or any combination of the hardware processor 502, the main memory 504, the static memory 506, or the storage device 516 may constitute machine-readable media.

While the machine-readable medium 522 is illustrated as a single medium, the term "machine-readable medium" may include a single medium or multiple media (e.g., a centralized or distributed database, and/or associated caches and servers) configured to store the one or more instructions 524.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 800 and that cause the machine 500 to perform any one or more of the techniques of the disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 524 may further be transmitted or received over a communications network 526 using a transmission medium via the network interface device/transceiver 520 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 820 may include one or more physical jacks (e.g., Ethernet, coaxial, or phone jacks) or one or more antennas to connect to the communications network 526. In an example, the network interface device/transceiver 520 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 500 and includes digital or analog communications signals or other intangible media to facilitate communication of such software. The instructions may implement one or more aspects of the methods/processes described above, including the operations of FIG. 2 as described herein.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

FIG. 6 is a block diagram of a radio architecture 600 in accordance with some embodiments. The radio architecture 600 may be implemented in any of the AP(s) and/or STA(s). Radio architecture 600 may include radio front-end module (FEM) circuitry 604a-b, radio IC circuitry 606a-b and baseband processing circuitry 608a-b. Radio architecture 600 as shown includes both Wireless Local Area Network (WLAN) functionality and Bluetooth (BT) functionality although embodiments are not so limited. In this disclosure, "WLAN" and "Wi-Fi" are used interchangeably.

FEM circuitry 604a-b may include a WLAN or Wi-Fi FEM circuitry 604a and a Bluetooth (BT) FEM circuitry 604b. The WLAN FEM circuitry 604a may include a receive signal path comprising circuitry configured to operate on WLAN RF signals received from one or more antennas 601, to amplify the received signals and to provide the amplified versions of the received signals to the WLAN radio IC circuitry 606a for further processing. The BT FEM circuitry 604b may include a receive signal path which may include circuitry configured to operate on BT RF signals received from one or more antennas 601, to amplify the received signals and to provide the amplified versions of the received signals to the BT radio IC circuitry 606b for further processing. FEM circuitry 604a may also include a transmit signal path which may include circuitry configured to amplify WLAN signals provided by the radio IC circuitry 606a for wireless transmission by one or more of the antennas 601. In addition, FEM circuitry 604b may also include a transmit signal path which may include circuitry configured to amplify BT signals provided by the radio IC circuitry 606b for wireless transmission by the one or more antennas. In the embodiment of FIG. 6, although FEM 604a and FEM 604b are shown as being distinct from one another, embodiments are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 606a-b as shown may include WLAN radio IC circuitry 606a and BT radio IC circuitry 606b. The WLAN radio IC circuitry 606a may include a receive signal path which may include circuitry to down-convert WLAN RF signals received from the FEM circuitry 604a and provide baseband signals to WLAN baseband processing circuitry 608a. BT radio IC circuitry 606b may in turn include a receive signal path which may include circuitry to down-convert BT RF signals received from the FEM circuitry 604b and provide baseband signals to BT baseband processing circuitry 608b. WLAN radio IC circuitry 606a may also include a transmit signal path which may include circuitry to up-convert WLAN baseband signals provided by the WLAN baseband processing circuitry 908a and provide WLAN RF output signals to the FEM circuitry 604a for subsequent wireless transmission by the one or more antennas 601. BT radio IC circuitry 606b may also include a transmit signal path which may include circuitry to up-convert BT baseband signals provided by the BT baseband processing circuitry 608b and provide BT RF output signals to the FEM circuitry 604b for subsequent wireless transmission by the one or more antennas 601. In the embodiment of FIG. 6, although radio IC circuitries 606a and 606b are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuitry 608a-b may include a WLAN baseband processing circuitry 608a and a BT baseband processing circuitry 608b. The WLAN baseband processing circuitry 608a may include a memory, such as, for example, a set of RAM arrays in a Fast Fourier Transform or Inverse Fast Fourier Transform block (not shown) of the WLAN baseband processing circuitry 608a. Each of the WLAN baseband circuitry 608a and the BT baseband circuitry 608b may further include one or more processors and control logic to process the signals received from the corresponding WLAN or BT receive signal path of the radio IC circuitry 606a-b, and to also generate corresponding WLAN or BT baseband signals for the transmit signal path of the radio IC circuitry 606a-b. Each of the baseband processing circuitries 608a and 608b may further include physical layer (PHY) and medium access control layer (MAC) circuitry, and may further interface with a device for generation and processing of the baseband signals and for controlling operations of the radio IC circuitry 606a-b.

Referring still to FIG. 6, according to the shown embodiment, WLAN-BT coexistence circuitry 613 may include logic providing an interface between the WLAN baseband circuitry 608a and the BT baseband circuitry 608b to enable use cases requiring WLAN and BT coexistence. In addition, a switch 603 may be provided between the WLAN FEM circuitry 604a and the BT FEM circuitry 604b to allow switching between the WLAN and BT radios according to application needs. In addition, although the antennas 601 are depicted as being respectively connected to the WLAN FEM circuitry 604a and the BT FEM circuitry 604b, embodiments include within their scope the sharing of one or more antennas as between the WLAN and BT FEMs, or the provision of more than one antenna connected to each of FEM 604a or 604b.

In some embodiments, the front-end module circuitry 604a-b, the radio IC circuitry 606a-b, and baseband processing circuitry 608a-b may be provided on a single radio card, such as wireless radio card 6. In some other embodiments, the one or more antennas 601, the FEM circuitry 604a-b and the radio IC circuitry 606a-b may be provided on a single radio card. In some other embodiments, the radio IC circuitry 606a-b and the baseband processing circuitry 608a-b may be provided on a single chip or integrated circuit (IC), such as IC 612.

In some embodiments, the wireless radio card 602 may include a WLAN radio card and may be configured for Wi-Fi communications, although the scope of the embodiments is not limited in this respect. In some of these embodiments, the radio architecture 600 may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 600 may be part of a Wi-Fi communication station (STA) such as a wireless access point (AP), a base station or a mobile device including a Wi-Fi device. In some of these embodiments, radio architecture 600 may be configured to transmit and receive signals in accordance with specific communication standards and/or protocols, such as any of the Institute of Electrical and Electronics Engineers (IEEE) standards including, 802.11n-2009, IEEE 802.11-2012, IEEE 802.11-2016, 802.11n-2009, 802.11ac, 802.11ah, 802.11ad, 802.11ay, 802.11ax and/or 802.11be standards and/or proposed specifications for WLANs, although the scope of embodiments is not limited in this respect. Radio architecture 600 may also be suitable to transmit and/or receive communications in accordance with other techniques and standards.

In some embodiments, the radio architecture 600 may be configured for high-efficiency Wi-Fi (HEW) communications in accordance with the IEEE 802.11ax standard. In these embodiments, the radio architecture 600 may be configured to communicate in accordance with an OFDMA technique, although the scope of the embodiments is not limited in this respect.

In some other embodiments, the radio architecture 600 may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, as further shown in FIG. 6, the BT baseband circuitry 608b may be compliant with a Bluetooth (BT) connectivity standard such as Bluetooth, Bluetooth 8.0 or Bluetooth 6.0, or any other iteration of the Bluetooth Standard.

In some embodiments, the radio architecture 600 may include other radio cards, such as a cellular radio card configured for cellular (e.g., 3GPP such as LTE, LTE-Advanced or 5G communications).

In some IEEE 802.11 embodiments, the radio architecture 600 may be configured for communication over various channel bandwidths including bandwidths having center frequencies of about 900 MHz, 2.4 GHz, 5 GHz, and bandwidths of about 2 MHz, 4 MHz, 5 MHz, 5.5 MHz, 6 MHz, 8 MHz, 10 MHz, 20 MHz, 40 MHz, 80 MHz (with contiguous bandwidths) or 80+80 MHz (160 MHz) (with non-contiguous bandwidths). In some embodiments, a 320 MHz channel bandwidth may be used. The scope of the embodiments is not limited with respect to the above center frequencies however.

Figure 7:
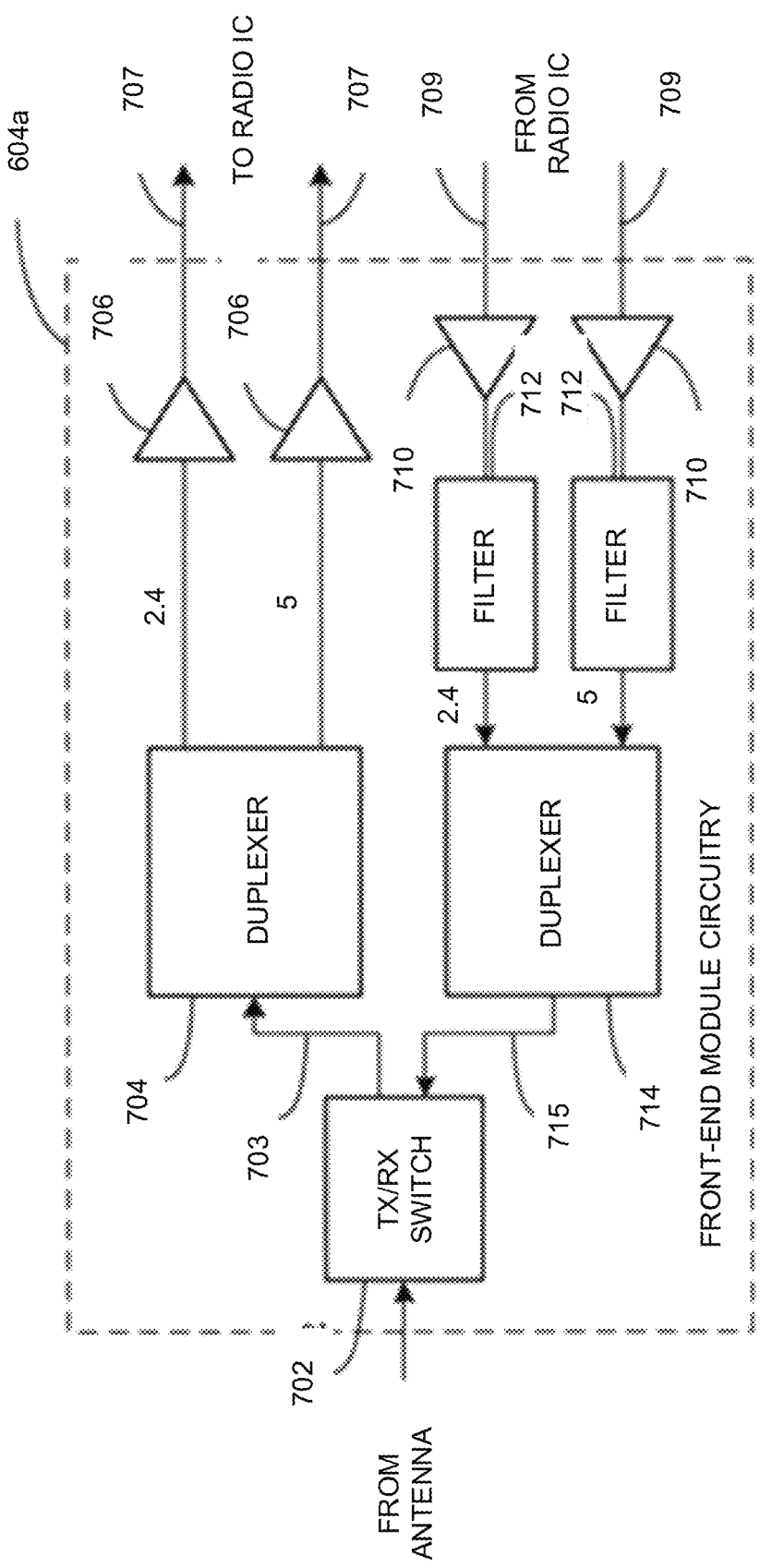
FIG. 7 is a functional block diagram illustrating the WLAN FEM circuitry of FIG. 6, according to some embodiments of the present disclosure.

FIG. 7 illustrates WLAN FEM circuitry 604a in accordance with some embodiments. Although the example of FIG. 7 is described in conjunction with the WLAN FEM circuitry 604a, the example of FIG. 7 may be described in conjunction with the example BT FEM circuitry 604b (FIG. 6), although other circuitry configurations may also be suitable.

In some embodiments, the FEM circuitry 604a may include a TX/RX switch 702 to switch between transmit mode and receive mode operation. The FEM circuitry 604a may include a receive signal path and a transmit signal path. The receive signal path of the FEM circuitry 604a may include a low-noise amplifier (LNA) 706 to amplify received RF signals 703 and provide the amplified received RF signals 707 as an output (e.g., to the radio IC circuitry 606a-b (FIG. 6)). The transmit signal path of the circuitry 604a may include a power amplifier (PA) to amplify input RF signals 709 (e.g., provided by the radio IC circuitry 606a-b), and one or more filters 712, such as band-pass filters (BPFs), low-pass filters (LPFs) or other types of filters, to generate RF signals 715 for subsequent transmission (e.g., by one or more of the antennas 601 (FIG. 6)) via an example duplexer 714.

In some dual-mode embodiments for Wi-Fi communication, the FEM circuitry 604a may be configured to operate in either the 2.4 GHz frequency spectrum or the 5 GHz frequency spectrum. In these embodiments, the receive signal path of the FEM circuitry 904a may include a receive signal path duplexer 1004 to separate the signals from each spectrum as well as provide a separate LNA 1006 for each spectrum as shown. In these embodiments, the transmit signal path of the FEM circuitry 604a may also include a power amplifier 710 and a filter 712, such as a BPF, an LPF or another type of filter for each frequency spectrum and a transmit signal path duplexer 704 to provide the signals of one of the different spectrums onto a single transmit path for subsequent transmission by the one or more of the antennas 601 (FIG. 6). In some embodiments, BT communications may utilize the 2.4 GHz signal paths and may utilize the same FEM circuitry 604a as the one used for WLAN communications.

Figure 8:
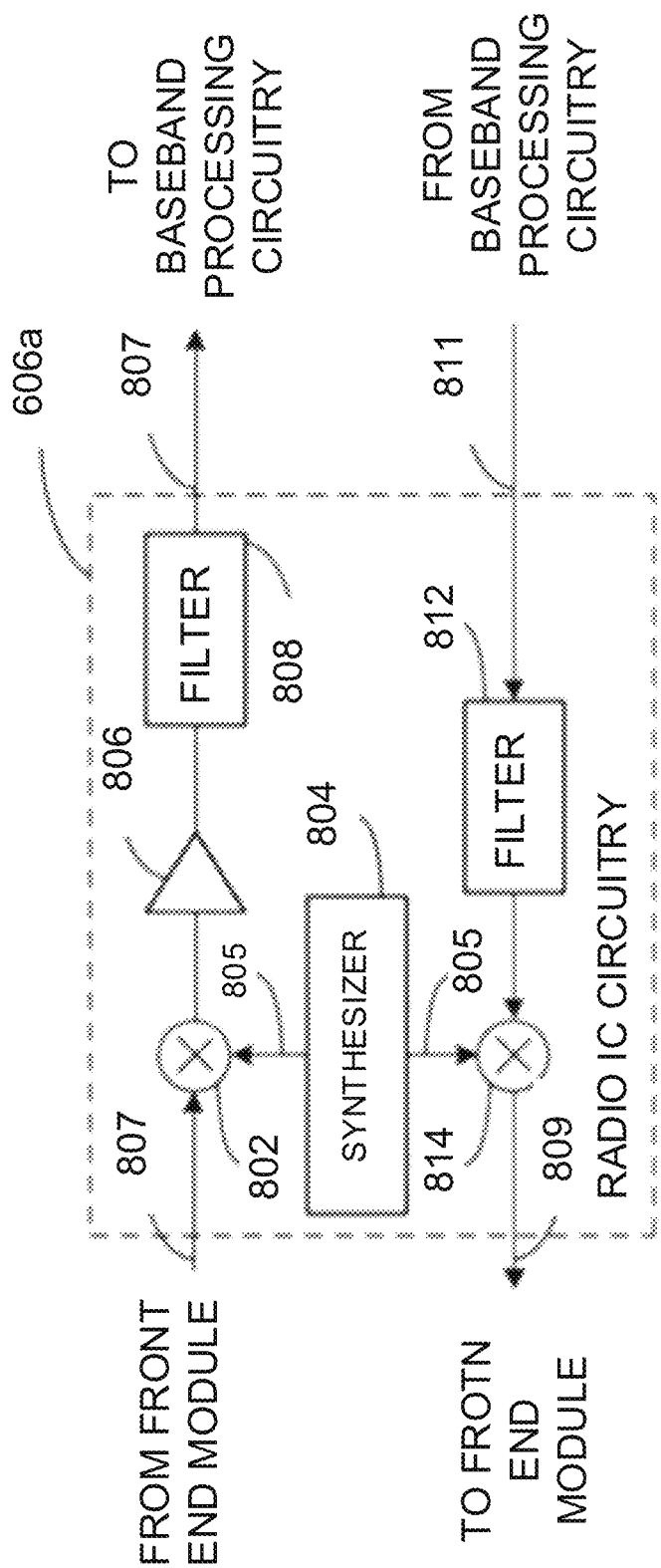
FIG. 8 is a functional block diagram illustrating the radio IC circuitry of FIG. 6, according to some embodiments of the present disclosure.

FIG. 8 illustrates radio IC circuitry 606a in accordance with some embodiments. The radio IC circuitry 606a is one example of circuitry that may be suitable for use as the WLAN or BT radio IC circuitry 606a/606b (FIG. 6), although other circuitry configurations may also be suitable. Alternatively, the example of FIG. 8 may be described in conjunction with the example BT radio IC circuitry 606b.

In some embodiments, the radio IC circuitry 606a may include a receive signal path and a transmit signal path. The receive signal path of the radio IC circuitry 606a may include at least mixer circuitry 802, such as, for example, down-conversion mixer circuitry, amplifier circuitry 806 and filter circuitry 808. The transmit signal path of the radio IC circuitry 606a may include at least filter circuitry 812 and mixer circuitry 814, such as, for example, up-conversion mixer circuitry. Radio IC circuitry 606a may also include synthesizer circuitry 804 for synthesizing a frequency 805 for use by the mixer circuitry 802 and the mixer circuitry 814. The mixer circuitry 802 and/or 1114 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 8 illustrates only a simplified version of a radio IC circuitry, and may include, although not shown, embodiments where each of the depicted circuitries may include more than one component. For instance, mixer circuitry 814 may each include one or more mixers, and filter circuitries 808 and/or 812 may each include one or more filters, such as one or more BPFs and/or LPFs according to application needs. For example, when mixer circuitries are of the direct-conversion type, they may each include two or more mixers.

In some embodiments, mixer circuitry 802 may be configured to down-convert RF signals 707 received from the FEM circuitry 604a-b (FIG. 6) based on the synthesized frequency 805 provided by synthesizer circuitry 804. The amplifier circuitry 806 may be configured to amplify the down-converted signals and the filter circuitry 808 may include an LPF configured to remove unwanted signals from the down-converted signals to generate output baseband signals 807. Output baseband signals 807 may be provided to the baseband processing circuitry 608a-b (FIG. 6) for further processing. In some embodiments, the output baseband signals 807 may be zero-frequency baseband signals, although this is not a requirement. In some embodiments, mixer circuitry 802 may comprise passive mixers, although the scope of the embodiments is not limited in this respect.

In some embodiments, the mixer circuitry 814 may be configured to up-convert input baseband signals 811 based on the synthesized frequency 805 provided by the synthesizer circuitry 804 to generate RF output signals 709 for the FEM circuitry 604a-b. The baseband signals 811 may be provided by the baseband processing circuitry 608a-b and may be filtered by filter circuitry 812. The filter circuitry 812 may include an LPF or a BPF, although the scope of the embodiments is not limited in this respect.

In some embodiments, the mixer circuitry 802 and the mixer circuitry 814 may each include two or more mixers and may be arranged for quadrature down-conversion and/or up-conversion respectively with the help of synthesizer 804. In some embodiments, the mixer circuitry 802 and the mixer circuitry 814 may each include two or more mixers each configured for image rejection (e.g., Hartley image rejection). In some embodiments, the mixer circuitry 802 and the mixer circuitry 814 may be arranged for direct down-conversion and/or direct up-conversion, respectively. In some embodiments, the mixer circuitry 802 and the mixer circuitry 814 may be configured for super-heterodyne operation, although this is not a requirement.

Mixer circuitry 802 may comprise, according to one embodiment: quadrature passive mixers (e.g., for the in-phase (I) and quadrature phase (Q) paths). In such an embodiment, RF input signal 707 from FIG. 7 may be down-converted to provide I and Q baseband output signals to be transmitted to the baseband processor.

Quadrature passive mixers may be driven by zero and ninety-degree time-varying LO switching signals provided by a quadrature circuitry which may be configured to receive a LO frequency (fLO) from a local oscillator or a synthesizer, such as LO frequency 805 of synthesizer 804 (FIG. 8). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety-degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have an 85% duty cycle and an 80% offset. In some embodiments, each branch of the mixer circuitry (e.g., the in-phase (I) and quadrature phase (Q) path) may operate at an 80% duty cycle, which may result in a significant reduction is power consumption.

The RF input signal 707 (FIG. 7) may comprise a balanced signal, although the scope of the embodiments is not limited in this respect. The I and Q baseband output signals may be provided to low-noise amplifier, such as amplifier circuitry 806 (FIG. 8) or to filter circuitry 808 (FIG. 8).

In some embodiments, the output baseband signals 807 and the input baseband signals 811 may be analog baseband signals, although the scope of the embodiments is not limited in this respect. In some alternate embodiments, the output baseband signals 807 and the input baseband signals 811 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 804 may be a fractional-N synthesizer or a fractional N/N+1 synthesizer, although the scope of the embodiments is not limited in this respect as other types of frequency synthesizers may be suitable. For example, synthesizer circuitry 804 may be a delta-sigma synthesizer, a frequency multiplier, or a synthesizer comprising a phase-locked loop with a frequency divider. According to some embodiments, the synthesizer circuitry 804 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuitry 804 may be provided by a voltage controlled oscillator (VCO), although that is not a requirement. A divider control input may further be provided by either the baseband processing circuitry 608a-b (FIG. 6) depending on the desired output frequency 805. In some embodiments, a divider control input (e.g., N) may be determined from a look-up table (e.g., within a Wi-Fi card) based on a channel number and a channel center frequency as determined or indicated by the example application processor 610. The application processor 610 may include, or otherwise be connected to, one of the example security signal converter 101 or the example received signal converter 103 (e.g., depending on which device the example radio architecture is implemented in).

In some embodiments, synthesizer circuitry 804 may be configured to generate a carrier frequency as the output frequency 805, while in other embodiments, the output frequency 805 may be a fraction of the carrier frequency (e.g., one-half the carrier frequency, one-third the carrier frequency). In some embodiments, the output frequency 805 may be a LO frequency (fLO).

Figure 9:
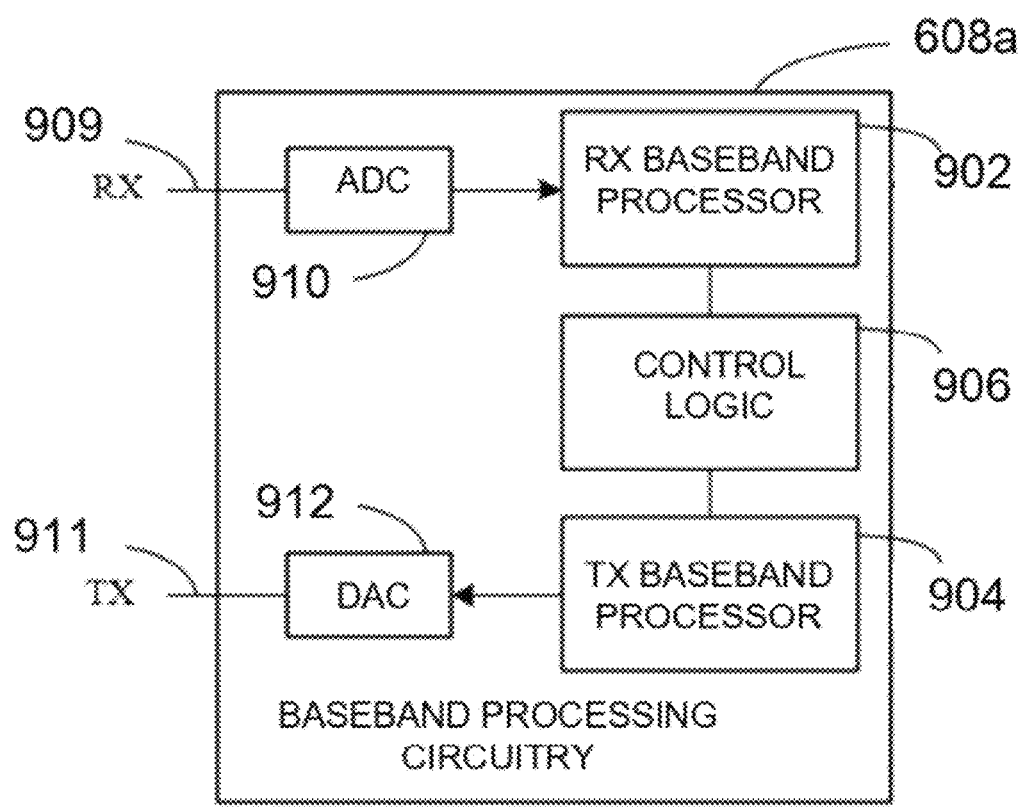
FIG. 9 is a functional block diagram illustrating the baseband processing circuitry of FIG. 6, according to some embodiments of the present disclosure.

FIG. 9 illustrates a functional block diagram of baseband processing circuitry 608a in accordance with some embodiments. The baseband processing circuitry 608a is one example of circuitry that may be suitable for use as the baseband processing circuitry 608a (FIG. 6), although other circuitry configurations may also be suitable. Alternatively, the example of FIG. 9 may be used to implement the example BT baseband processing circuitry 608b of FIG. 6.

The baseband processing circuitry 608a may include a receive baseband processor (RX BBP) 902 for processing receive baseband signals 909 provided by the radio IC circuitry 606a-b (FIG. 6) and a transmit baseband processor (TX BBP) 1204 for generating transmit baseband signals 911 for the radio IC circuitry 606a-b. The baseband processing circuitry 608a may also include control logic 906 for coordinating the operations of the baseband processing circuitry 608a.

In some embodiments (e.g., when analog baseband signals are exchanged between the baseband processing circuitry 608a-b and the radio IC circuitry 606a-b), the baseband processing circuitry 608a may include ADC 910 to convert analog baseband signals 909 received from the radio IC circuitry 906a-b to digital baseband signals for processing by the RX BBP 902. In these embodiments, the baseband processing circuitry 908a may also include DAC 912 to convert digital baseband signals from the TX BBP 904 to analog baseband signals 911.

In some embodiments that communicate OFDM signals or OFDMA signals, such as through baseband processor 608a, the transmit baseband processor 904 may be configured to generate OFDM or OFDMA signals as appropriate for transmission by performing an inverse fast Fourier transform (IFFT). The receive baseband processor 902 may be configured to process received OFDM signals or OFDMA signals by performing an FFT. In some embodiments, the receive baseband processor 902 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring back to FIG. 6, in some embodiments, the antennas 601 (FIG. 6) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 601 may each include a set of phased-array antennas, although embodiments are not so limited.

Although the radio architecture 600 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

ADDITIONAL NOTES AND EXAMPLES

Example 1 includes a method, comprising: performing a 4-way handshake between an initiating entity and a responding entity to establish a PMKSA; receiving, by the initiating entity, a frame from the responding entity during the 4-way handshake, wherein the frame comprises an indication of usage of private limited connection for all responding entities in a network identified by a SSID of the responding entity; and establishing, by the initiating entity, a private limited connection in the network identified by the SSID of the responding entity.

Example 2 includes the method of Example 1, further comprising: performing frame exchanges between the initiating entity and any of responding entities in the network identified by the SSID of the responding entity using the private limited connection.

Example 3 includes the method of Example 1 or 2, wherein the frame is a message 3 of the 4-way handshake.

Example 4 includes the method of any of Examples 1-3, wherein the indication is in a Key Data Encapsulation (KDE) provided in the message 3 of the 4-way handshake.

Example 5 includes the method of Example 4, wherein the KDE is a transition disable KDE in the message 3 of the 4-way handshake as defined in WPA3.

Example 6 includes the method of Example 5, wherein the transition disable KDE comprises a Transition Disable Bitmap field, which comprises a bit to indicate the usage of private limited connection.

Example 7 includes the method of Example 4, wherein the KDE is a downgrade prevention KDE in the message 3 of the 4-way handshake.

Example 8 includes the method of Example 7, wherein the downgrade prevention KDE comprises a Downgrade Prevention Bitmap Field, which comprises a bit to indicate the usage of the private limited connection.

Example 9 includes the method of any of Examples 1-8, wherein the frame comprises a capability bit to indicate whether the responding entity supports the private limited connection.

Example 10 includes the method of any of Examples 1-9, wherein the 4-way handshake comprises a FT 4-way handshake.

Example 11 includes the method of any of Examples 1-10, wherein the frame exchange using the private limited connection comprises only basic and standardized capability and operation elements.

Example 12 includes the method of any of Examples 1-11, wherein the initiating entity is a non-AP STA and the responding entity is an AP.

Example 13 includes the method of any of Examples 1-11, wherein the initiating entity is a non-AP Multi-link device (MLD) and the responding entity is an AP MLD.

Example 14 includes an apparatus, comprising: interface circuitry; and processor circuitry coupled with the interface circuitry and configured to: perform a 4-way handshake between a initiating entity and a responding entity to establish a PMKSA; receive, by the initiating entity, a frame from the responding entity during the 4-way handshake, wherein the frame comprises an indication of usage of private limited connection for all responding entities in a network identified by a SSID of the responding entity; an establish, by the initiating entity, a private limited connection in the network identified by the SSID of the responding entity.

Example 15 includes the apparatus of Example 14, the processor circuitry is further configured to: perform information exchanges between the initiating entity and any of responding entities in the network identified by the SSID of the responding entity using the private limited connection.

Example 16 includes the apparatus of any of Example 14 or 15, wherein the frame is a message 3 of the 4-way handshake.

Example 17 includes the apparatus of any of Examples 14-16, wherein the indication is in a Key Data Encapsulation (KDE) provided in the message 3 of the 4-way handshake.

Example 18 includes the apparatus of Example 17, wherein the KDE is a transition disable KDE in the message 3 of the 4-way handshake as defined in WPA3.

Example 19 includes the apparatus of Example 18, wherein the transition disable KDE comprises a Transition Disable Bitmap field, which comprises a bit to indicate the usage of private limited connection.

Example 20 includes the apparatus of Example 17, wherein the KDE is a downgrade prevention KDE in the message 3 of the 4-way handshake.

Example 21 includes the apparatus of Example 20, wherein the downgrade prevention KDE comprises a Downgrade Prevention Bitmap Field, which comprises a bit to indicate the usage of the private limited connection.

Example 22 includes the apparatus of any of Examples 14-21, wherein the frame comprises a capability bit to indicate whether the responding entity supports the private limited connection.

Example 23 includes the apparatus of any of Examples 14-22, wherein the 4-way handshake comprises a FT 4-way handshake.

Example 24 includes the apparatus of any of Examples 14-23, wherein the frame exchange using the private limited connection comprises only basic and standardized capability and operation elements.

Example 25 includes the apparatus of any of Examples 14-24, wherein the initiating entity is a non-AP STA and the responding entity is an AP.

Example 26 includes the apparatus of any of Examples 14-24, wherein the initiating entity is a non-AP Multi-link device (MLD) and the responding entity is an AP MLD.

Example 27 includes a device, comprising: means for performing a 4-way handshake between an initiating entity and a responding entity to establish a PMKSA; means for receiving a frame from the responding entity during the 4-way handshake, wherein the frame comprises an indication of usage of private limited connection for all responding entities in a network identified by a SSID of the responding entity; and means for establishing a private limited connection in the network identified by the SSID of the responding entity.

Example 28 includes the device of Example 27, further comprising: means for performing frame exchanges between the initiating entity and any of responding entities in the network identified by the SSID of the responding entity using the private limited connection.

Example 29 includes the device of Example 27 or 28, wherein the frame is a message 3 of the 4-way handshake.

Example 30 includes the device of any of Examples 27-29, wherein the indication is in a Key Data Encapsulation (KDE) provided in the message 3 of the 4-way handshake.

Example 31 includes the device of Example 30, wherein the KDE is a transition disable KDE in the message 3 of the 4-way handshake as defined in WPA3.

Example 32 includes the device of Example 31, wherein the transition disable KDE comprises a Transition Disable Bitmap field, which comprises a bit to indicate the usage of private limited connection.

Example 33 includes the device of Example 30, wherein the KDE is a downgrade prevention KDE in the message 3 of the 4-way handshake.

Example 34 includes the device of Example 33, wherein the downgrade prevention KDE comprises a Downgrade Prevention Bitmap Field, which comprises a bit to indicate the usage of the private limited connection.

Example 35 includes the device of any of Examples 27-34, wherein the frame comprises a capability bit to indicate whether the responding entity supports the private limited connection.

Example 36 includes the device of any of Examples 27-35, wherein the 4-way handshake comprises a FT 4-way handshake.

Example 37 includes the device of any of Examples 27-36, wherein the frame exchange using the private limited connection comprises only basic and standardized capability and operation elements.

Example 38 includes the device of any of Examples 27-37, wherein the initiating entity is a non-AP STA and the responding entity is an AP.

Example 39 includes the device of any of Examples 27-37, wherein the initiating entity is a non-AP Multi-link device (MLD) and the responding entity is an AP MLD.

Example 40 includes a computer-readable medium having instructions stored thereon, wherein the instructions, when executed by processor, cause the processor to: perform a 4-way handshake between an initiating entity and a responding entity to establish a PMKSA; receive, by the initiating entity, a frame from the responding entity during the 4-way handshake, wherein the frame comprises an indication of usage of private limited connection for all responding entities in a network identified by a SSID of the responding entity; and establish, by the initiating entity, a private limited connection in the network identified by the SSID of the responding entity.

Example 41 includes the computer-readable medium of Example 40, further comprising instructions, when executed by processor, cause the processor to: perform frame exchanges between the initiating entity and any of responding entities in the network identified by the SSID of the responding entity using the private limited connection.

Example 42 includes the computer-readable medium of Example 40 or 41, wherein the frame is a message 3 of the 4-way handshake.

Example 43 includes the computer-readable medium of any of Examples 40-42, wherein the indication is in a Key Data Encapsulation (KDE) provided in the message 3 of the 4-way handshake.

Example 44 includes the computer-readable medium of Example 43, wherein the KDE is a transition disable KDE in the message 3 of the 4-way handshake as defined in WPA3.

Example 45 includes the computer-readable medium of Example 44, wherein the transition disable KDE comprises a Transition Disable Bitmap field, which comprises a bit to indicate the usage of private limited connection.

Example 46 includes the computer-readable medium of Example 43, wherein the KDE is a downgrade prevention KDE in the message 3 of the 4-way handshake.

Example 47 includes the computer-readable medium of Example 46, wherein the downgrade prevention KDE comprises a Downgrade Prevention Bitmap Field, which comprises a bit to indicate the usage of the private limited connection.

Example 48 includes the computer-readable medium of any of Examples 40-47, wherein the frame comprises a capability bit to indicate whether the responding entity supports the private limited connection.

Example 49 includes the computer-readable medium of any of Examples 40-48, wherein the 4-way handshake comprises a FT 4-way handshake.

Example 50 includes the computer-readable medium of any of Examples 40-49, wherein the frame exchange using the private limited connection comprises only basic and standardized capability and operation elements.

Example 51 includes the computer-readable medium of any of Examples 40-50, wherein the initiating entity is a non-AP STA and the responding entity is an AP.

Example 52 includes the computer-readable medium of any of Examples 40-50, wherein the initiating entity is a non-AP Multi-link device (MILD) and the responding entity is an AP MLD.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A method, comprising:
performing a 4-way handshake between an initiating entity and a responding entity to establish a Pairwise Master Key Security Association (PMKSA);
receiving, by the initiating entity, a frame from the responding entity during the 4-way handshake, wherein the frame comprises an indication of usage of private limited connection for all responding entities in a network identified by a SSID of the responding entity;
establishing, by the initiating entity, a private limited connection in the network identified by the SSID of the responding entity; and
performing frame exchanges between the initiating entity and any of responding entities in the network identified by the SSID of the responding entity using the private limited connection, wherein the frame exchange using the private limited connection comprises only basic and standardized capability and operation elements, and
wherein the initiating entity is a non-AP STA and the responding entity is an AP; or
wherein the initiating entity is a non-AP Multi-link device (MLD) and the responding entity is an AP MLD.

2. The method of claim 1 wherein the frame is a message 3 of the 4-way handshake.

3. The method of claim 1, wherein the indication is in a Key Data Encapsulation (KDE) provided in the message 3 of the 4-way handshake.

4. The method of claim 3, wherein the KDE is a transition disable KDE in the message 3 of the 4-way handshake as defined in WPA3.

5. The method of claim 4, wherein the transition disable KDE comprises a Transition Disable Bitmap field, which comprises a bit to indicate the usage of private limited connection.

6. The method of claim 3, wherein the KDE is a downgrade prevention KDE in the message 3 of the 4-way handshake.

7. The method of claim 6, wherein the downgrade prevention KDE comprises a Downgrade Prevention Bitmap Field, which comprises a bit to indicate the usage of the private limited connection.

8. The method of claim 1, wherein the frame comprises a capability bit to indicate whether the responding entity supports the private limited connection.

9. The method of claim 1, wherein the 4-way handshake comprises a Fast basic service set (BSS) transition (FT) 4-way handshake.

10. An apparatus, comprising:
interface circuitry; and
processor circuitry coupled with the interface circuitry and configured to:
perform a 4-way handshake between a initiating entity and a responding entity to establish a Pairwise Master Key Security Association (PMKSA);
receive, by the initiating entity, a frame from the responding entity during the 4-way handshake, wherein the frame comprises an indication of usage of private limited connection for all responding entities in a network identified by a SSID of the responding entity;

establish, by the initiating entity, a private limited connection in the network identified by the SSID of the responding entity; and perform frame exchanges between the initiating entity and any of responding entities in the network identified by the SSID of the responding entity using the private limited connection, wherein the frame exchange using the private limited connection comprises only basic and standardized capability and operation elements, and wherein the initiating entity is a non-AP STA and the responding entity is an AP; or wherein the initiating entity is a non-AP Multi-link device (MLD) and the responding entity is an AP MLD.

11. The apparatus of claim 10, wherein the frame is a message 3 of the 4-way handshake.

12. The apparatus of claim 10, wherein the indication is in a Key Data Encapsulation (KDE) provided in the message 3 of the 4-way handshake.

13. The apparatus of claim 12, wherein the KDE is a transition disable KDE in the message 3 of the 4-way handshake as defined in WPA3.

14. The apparatus of claim 13, wherein the transition disable KDE comprises a Transition Disable Bitmap field, which comprises a bit to indicate the usage of private limited connection.

15. The apparatus of claim 12, wherein the KDE is a downgrade prevention KDE in the message 3 of the 4-way handshake.

16. The apparatus of claim 15, wherein the downgrade prevention KDE comprises a Downgrade Prevention Bitmap Field, which comprises a bit to indicate the usage of the private limited connection.

17. The apparatus of claim 10, wherein the frame comprises a capability bit to indicate whether the responding entity supports the private limited connection.

18. The apparatus of claim 10, wherein the 4-way handshake comprises a Fast basic service set (BSS) transition (FT) 4-way handshake.

* * * * *